(12) United States Patent
Evans

(10) Patent No.: US 11,240,963 B2
(45) Date of Patent: Feb. 8, 2022

(54) BAG BRACKET

(71) Applicant: Craig Evans, Frankenmuth, MI (US)

(72) Inventor: Craig Evans, Frankenmuth, MI (US)

( * ) Notice: Subject to any disclaimer, the term of this patent is extended or adjusted under 35 U.S.C. 154(b) by 281 days.

(21) Appl. No.: 16/294,064

(22) Filed: Mar. 6, 2019

(65) Prior Publication Data

US 2020/0281120 A1 Sep. 10, 2020

(51) Int. Cl.
*A01D 43/063* (2006.01)
*F16M 13/02* (2006.01)
*B65F 1/14* (2006.01)
*B65F 1/00* (2006.01)
*B65B 67/12* (2006.01)

(52) U.S. Cl.
CPC ...... *A01D 43/0636* (2013.01); *B65B 67/1222* (2013.01); *B65F 1/0006* (2013.01); *B65F 1/1415* (2013.01); *F16M 13/02* (2013.01); *B65F 2250/108* (2013.01); *B65F 2250/114* (2013.01)

(58) Field of Classification Search
CPC ............ A01D 43/0636; B65B 67/1227; B65F 1/0006; B65F 1/1415
USPC .......................................................... 248/100
See application file for complete search history.

(56) References Cited

U.S. PATENT DOCUMENTS

| | | | | |
|---|---|---|---|---|
| 2,079,592 A | * | 5/1937 | Battin | B65B 67/1244 248/100 |
| 2,789,781 A | * | 4/1957 | Miller | B65B 67/1244 248/100 |
| 4,532,756 A | * | 8/1985 | Merkel | A01D 43/0635 56/16.6 |
| 4,815,866 A | * | 3/1989 | Martone | B65B 67/1238 141/390 |
| 6,019,381 A | * | 2/2000 | Krawczyk | B62B 1/002 211/126.1 |
| 6,226,970 B1 | * | 5/2001 | Busboom | A01D 43/063 56/16.6 |
| 8,550,512 B2 | * | 10/2013 | Jones, Jr. | A01K 23/005 294/1.5 |
| 9,271,607 B2 | * | 3/2016 | Chung | A47J 37/0786 |
| 10,604,053 B2 | * | 3/2020 | Stoner | B65F 1/1415 |
| 2004/0195467 A1 | * | 10/2004 | Passage | B65F 1/1415 248/99 |
| 2011/0284703 A1 | * | 11/2011 | Auguste | B65F 1/1415 248/99 |
| 2016/0304248 A1 | * | 10/2016 | Cagle | B65B 67/12 |
| 2018/0054966 A1 | * | 3/2018 | Volovsek | A01D 43/0636 |

* cited by examiner

*Primary Examiner* — Bradley Duckworth

(57) ABSTRACT

A bag bracket. The bag bracket is a horizontal, planar, support assembly. The bag bracket supports a refuse bag assembly. The refuse bag assembly supports a collection bag. The collection bag comprises a front, a back, a bottom and two sides with top edges having loops.

3 Claims, 3 Drawing Sheets

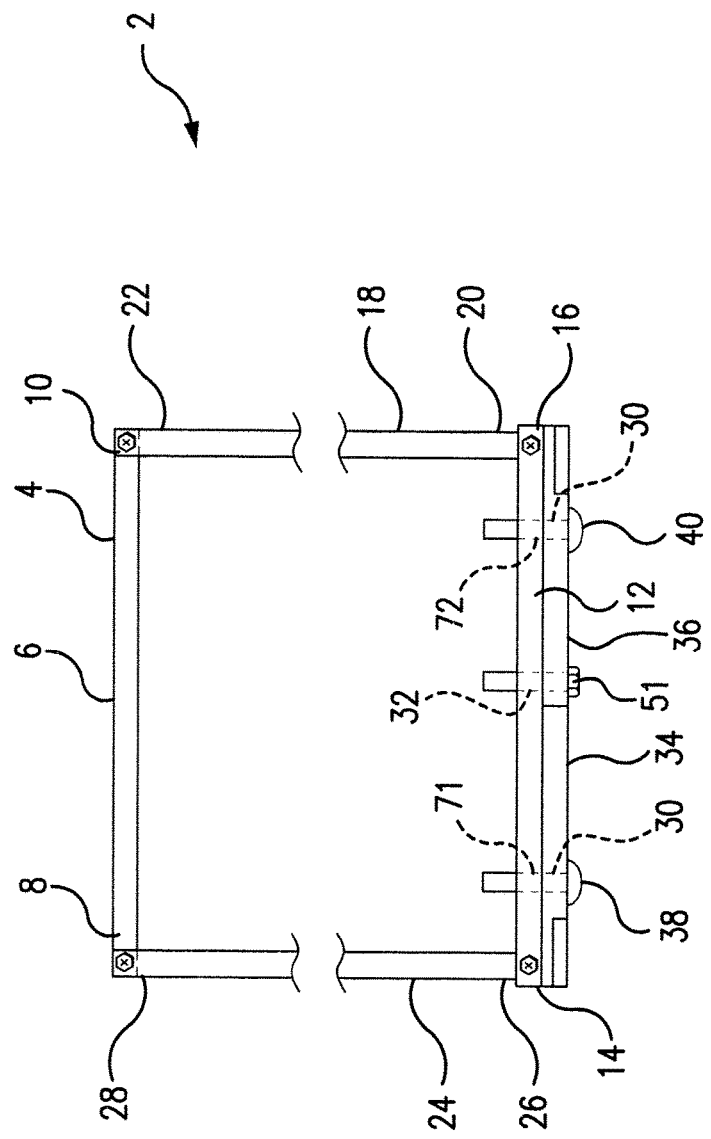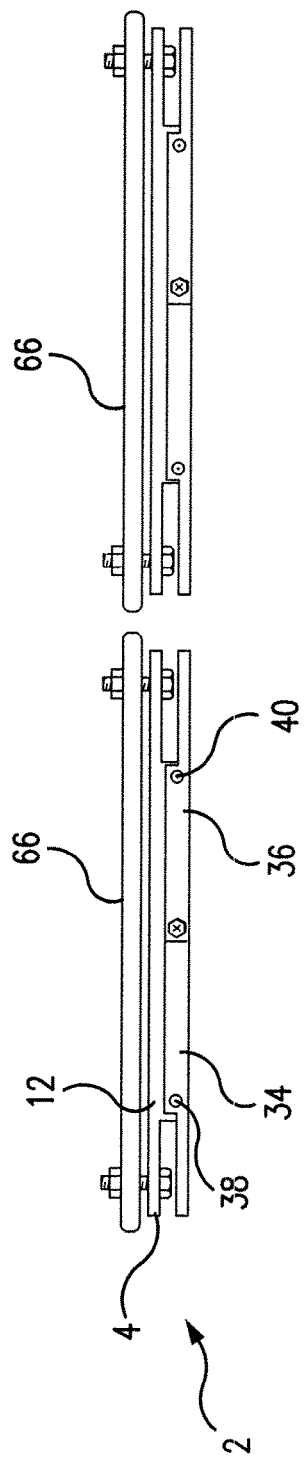

BAG BRACKET

BACKGROUND OF THE INVENTION

The applicant is unaware of any prior art in this field of invention.

THE INVENTION

The present invention is a bag bracket. The bag bracket is a horizontal, planar, support assembly. The assembly comprises a back rail, a front rail, two identical side rails all connected. The front rail has terminal ends.

The front rail has a first opening and a second opening therethrough. The front rail has a support bar located on each side of the terminal end. Each of the support bars are rotatably attached to the front rail with a pin inserted through the support bar and each of the first openings of the front rail. Each of the support bars is lockable to the front rail with a pin inserted through the support rail and each of the second opening in the front rail. There are two support rods resting on the support bars.

The bag bracket supports a refuse bag assembly. The refuse bag assembly comprising in combination, a horizontal, planer, support assembly with a refuse bag mounted on the support rods. The refuse bag consists of a collection bag. The collection bag comprises a front, a back, a bottom and two sides with top edges.

Each of the top edges are folded over and contacting each of their sides, respectively, to create a loop through which rods can be inserted. The refuse bag assembly is mounted on a support frame for collection bags on a riding mower.

In one embodiment the collection bags are manufactured from paper.

In another embodiment the collection bag is manufactured from fabric.

In other embodiments the fabric is selected from nylon, polyester, plastic, and the collection bag is disposable.

BRIEF DESCRIPTION OF THE DRAWINGS

FIG. 1 is a full top view of the bag bracket of this invention.

FIG. 2 illustrates a pair of bag brackets from the front with the front rail and support rods in the closed position.

DETAILED DESCRIPTION OF THE DRAWINGS

Figure 3:
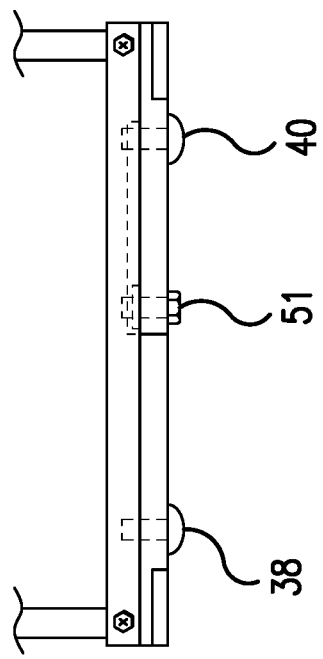
FIG. 3 is a full top view of the front rail.

FIG. 1 shows the bag bracket 2 from the top. The bag bracket 2 is a horizontal, planar, support assembly. The assembly comprises a back rail 6, a front rail 12, two identical side rails 18, 24 all connected end for end. The front rail 12 has terminal ends 14 and 16. The back rail 6 has two terminal ends 8 and 10. The first side rail 18 has two terminal ends 20 and 22. The second side rail has two terminal ends 26 and 28.

The front rail 12 has two first openings 71 and 72 and a second opening 32 therethrough. The front rail 12 has a support bar located on each side of the terminal end, the first support bar 34 and the second support bar 36.

Each of the support bars 34 and 36 are rotatably attached to the front rail 12 with a pin 51 inserted through the support bar 34 and 36 and each of the first openings 71 and 72 of the front rail 12 have pins 38 and 40 inserted therethrough. Thus, each of the support bars 34 and 36 is lockable to the front rail 12 with a pin 38 and 40 inserted through support bars 34, 36 (openings 30) and each of the first openings 71 and 72 in the front rail 12.

There are two support rods 46 and 48 (shown in FIG. 6) resting on the support bars 34 and 36.

FIG. 2 shows a pair of bag brackets 2 from the front, mounted on a bracket 66 that is mounted on a riding mower with the front rail 12 and support rods 34 and 36 in the closed position. The front rail 12 of the support assembly 4 has the support bars 34 and 36 rotatably attached to the front rail 12 by the pins 38 and 40. When the pins 38 and 40 are removed the support bars can be lowered to allow the removal of the support rods 46 and 48 and then the removal of the bag 50 shown in FIG. 6.

FIG. 3 shows the front rail 12 from the top. There is shown the rotatable connection 51. When pins 38 and 40 are removed the support bars 34 and 36 will rotate downward.

Figure 4:
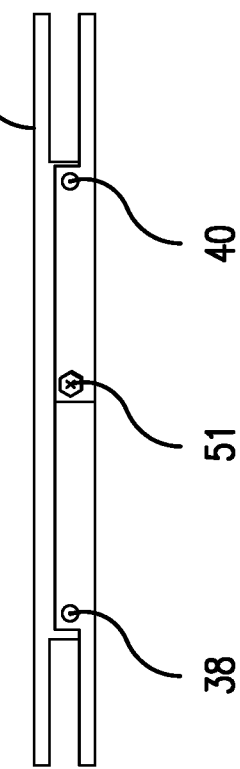
FIG. 4 is a full front view of the front rail in the closed position.

FIG. 4 shows the front rail 12 from the front in the closed position. When the pins 38 and 40 are in place and the support bars 34 and 36 are in the upward position the front rail 12 is in the closed position.

Figure 5:
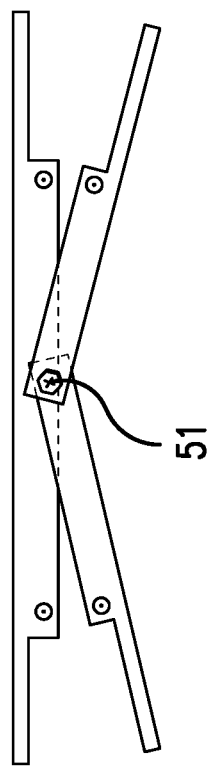
FIG. 5 is a full front view of the front rail in the open position.

FIG. 5 shows the front rail 12 from the front in the open position. Here the pins 38 and 40 have been removed allowing the support bars 34 and 36 to rotate downward or in the open position.

Figure 6:
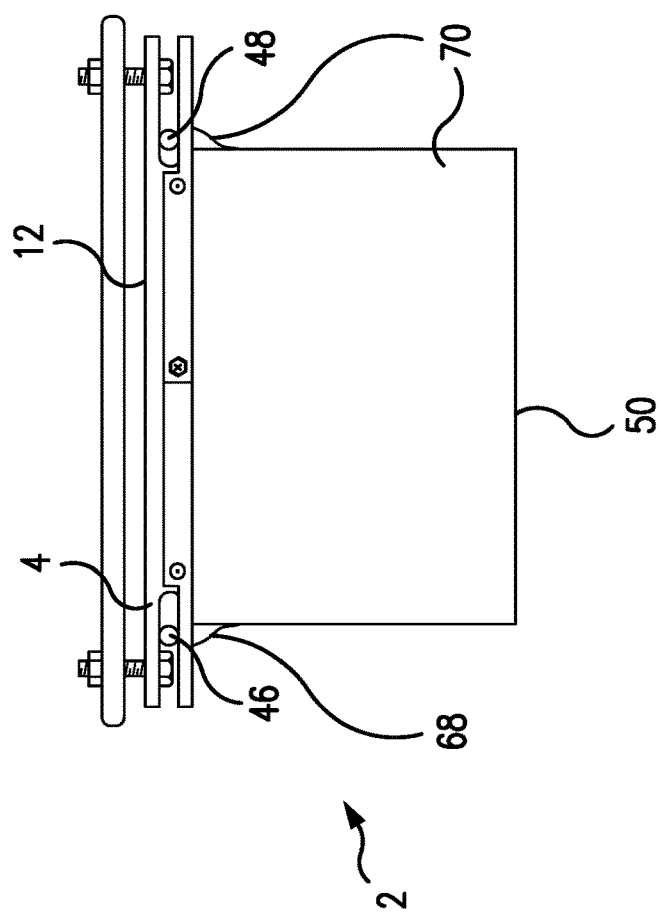
FIG. 6 is a full front view of the bag assembly attached to a bar of a riding mower, including a bag.

FIG. 6 shows the bag bracket assembly from the front with a bag 50 attached. Also shown are the support rods 46 and 48. The folded loops 68 and 70 are also shown. The first folded loop 68 and the second folded loop 70 accept the support rods 46 and 48 locking the bag 50 into the assembly 4.

Figure 7:
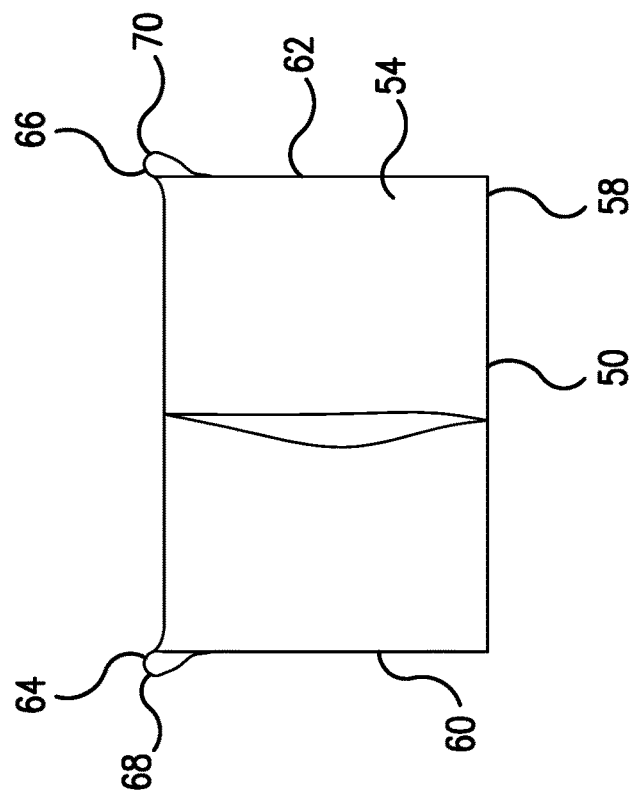
FIG. 7 is a full end view of a collection bag of this invention.

FIG. 7 shows the collection bag 50. The collection bag 50 comprises an end 54, a bottom 58 and two sides 60 and 62 with top edges. There is a first side edge 64 and a second side 66. The side edges 64 and 66 are folded forming loops 68 and 70. These loops 68 and 70 allow the support rods 46 and 48 to pass through the loops 68 and 70 supporting the bag 50 within the bag bracket 2.

Each of the top edges 64 and 66 are folded over and contacting each of the sides 60 and 62 respectively, to create a loop 68 and 70 through which the support rods 46 and 48 can be inserted.

The refuse bag 50 assembly is mounted on a support frame 4 for collection of debris discharged from a riding mower.

What is claimed is:

1. A horizontal, planar, support assembly, said support assembly comprising:
 a back rail, a front rail, two identical side rails all connected together, said front rail having terminal ends;
 said front rail having two first openings and a centered second opening therethrough;
 said front rail having a support bar located on each said terminal end, each said support bar being rotatably attached to said front rail with a pin inserted through said support bar and said second opening of said front rail;

said support bar being lockable to said front rail with a pin inserted through each said support bar and one of said first openings in said front rail, and, two support rods resting on said support bars.

2. A refuse bag assembly, said refuse bag assembly comprising in combination;

a horizontal, planer, support assembly as claimed in claim 1;

a refuse bag mounted on said support rods.

3. A refuse bag assembly as claimed in claim 2 wherein the assembly is mounted on a support frame for collection bags on a riding mower.

\* \* \* \* \*